United States Patent [19]
Duong et al.

[11] Patent Number: 5,945,472
[45] Date of Patent: Aug. 31, 1999

[54] HIGHLY-FILLED CHLORINE-FREE SURFACE COVERING

[75] Inventors: Chau H. Duong, Lititz; Harry D. Ward, Lancaster; Lowell E. West, Elizabethtown, all of Pa.

[73] Assignee: Armstrong World Industries, Inc., Lancaster, Pa.

[21] Appl. No.: 09/024,050

[22] Filed: Feb. 16, 1998

Related U.S. Application Data

[60] Provisional application No. 60/039,659, Feb. 28, 1997.

[51] Int. Cl.$^6$ .............................. C08K 3/26; C08L 51/06; C08F 222/06
[52] U.S. Cl. ......................... 524/425; 524/436; 524/274; 525/285; 526/348.5; 428/36.9; 428/516
[58] Field of Search ..................................... 524/425, 436, 524/274; 525/285; 428/36.9, 516; 526/348.5

[56] References Cited

U.S. PATENT DOCUMENTS 4,722,959  2/1988  Inoue et al. .............................. 524/436

Primary Examiner—James J. Seidleck
Assistant Examiner—Olga Asinovsky

[57] ABSTRACT

A highly filled surface covering, preferably a floor covering and more preferably a floor tile, includes a resin layer which has about 80% to about 95% by weight of filler and a chlorine-free binder. The binder includes a mixture of a maleic anhydride grafted polyethylene and a substantially linear ethylene/octene copolymer. The ratio of maleic anhydride grafted polyethylene and ethylene/octene copolymer is from about 1:5 to about 1:15 by weight. The preferred formulation for the binder includes a solid tackifier selected from the group consisting of a hydrocarbon resin having an ester moiety and hydrogenated aromatic resin.

10 Claims, No Drawings

HIGHLY-FILLED CHLORINE-FREE SURFACE COVERING

This application claims a benefit of U.S. Provisional Application No. 60/039,659, filed Feb. 28, 1997 under 35 U.S.C. 199(e).

FIELD OF THE INVENTION

The present invention relates to a highly-filled, chlorine-free surface covering. More particularly, the invention relates to surface coverings, including sheet goods and tile, and more particularly floor coverings.

The surface coverings have about 80% to about 95% by weight of filler and a binder including a mixture of a substantially linear ethylene/octene copolymer and a maleic anhydride grafted polyethylene, the ratio of maleic anhydride grafted polyethylene and ethylene/octene copolymer being from about 1:5 to about 1:15 by weight. Preferably, the ratio of maleic anhydride grafted polyethylene and ethylene/octene copolymer being from about 1:9 to about 1:12 by weight.

The preferred ethylene/octene copolymer has a melt index of between about 10 and about 100 grams per 10 minutes, more preferably between about 30 and about 70 grams per 10 minutes. Preferably, the copolymer has a density of between about 0.87 and about 0.91 grams per cubic centimeter, more preferably between about 0.885 and about 0.902 grams per cubic centimeter.

The preferred binder also includes a tackifier. The preferred tackifier is either a hydrocarbon resin having an ester moiety or a hydrogenated aromatic resin.

BACKGROUND OF THE INVENTION

Conventional polyolefins are difficult to mix at a filler loading that is greater than 50% by weight. Therefore, product costs of polyolefin products are not competitive with filled-polyvinyl chloride (PVC) products. New polyolefin resins, based on metallocene or single site catalysts, offer new opportunities to produce non-PVC, chlorine-free products at lower costs since these resins will accept a higher filler loading.

Filled-PVC floor tiles have been in the market for years. However, the filled-PVC flooring has limited physical performance such as poor impact resistance and heat stability. The chlorine-free compounds of the present invention can be converted into surface covering components using the traditional PVC manufacturing processes.

As used herein, the term "binder" means the components of the chorine-free composition other than filler or pigments.

SUMMARY OF THE INVENTION

According to the present invention, a highly-filled surface covering is provided comprising a filled resin layer. The filled resin layer has about 80%, to about 95% by weight of filler and the remainder is a chlorine-free binder. The binder comprises a mixture of a maleic anhydride grafted polyethylene and a substantially linear ethylene/octene copolymer. The ratio of maleic anhydride grafted polyethylene and ethylene/octene copolymer is from about 1:5 to about 1:15 by weight.

The preferred ethylene/octene copolymer has a melt index of between about 10 and about 100 grams per 10 minutes, and a density of between about 0.87 and about 0.91 grams per cubic centimeter. Preferably the binder level in the filled resin layer is between about 11.5% and about 12.5% by weight.

DETAILED DESCRIPTION OF THE INVENTION

This invention includes the use of a metallocene or single site catalyst-based polyolefin resin to make surface coverings such as floor tiles. The product structure includes a filled-resin, homogeneous layer having about 80% to about 95% by weight of filler and the remainder being a chlorine-free binder. Preferably, the filler is about 85% to about 90% by weight of filler, including pigment. At less than about 80% filler, the surface covering becomes cost prohibitive. At greater than about 95% filler, it becomes difficult to fully wet the filler with binder and desirable properties become unacceptable.

The binder comprises a mixture of a substantially linear ethylene/octene copolymer and a maleic anhydride grafted polyethylene (MAH-g-PE). Further, if a hydrocarbon resin tackifier is used as an additive to the binder, roll tack in a 2-roll mill process for sheeting or forming is improved.

The major component in the preferred binder mixture is a copolymer of ethylene and octene that has a melt index of between about 10 and about 100 grams per 10 minutes and a density of between about 0.87 to about 0.91 grams per cubic centimeter. The preferred ratio of maleic anhydride grafted polyethylene and ethylene/octene copolymer is about 1:9 to 1:12 by weight.

The maleic anhydride grafted polyethylene helps wet-out the filler with the binder. However, since it is more expensive than the ethylene/octene copolymer, it is desirable to minimize and amount of the maleic anhydride grafted polyethylene. Use of a binder resin having a ratio of maleic anhydride grafted polyethylene and ethylene/octene copolymer of greater than 1:5 is cost prohibitive. Based on experimentation, it is believed that a ratio of maleic anhydride grafted polyethylene and ethylene/octene copolymer of at least 1:15 would satisfactorily wet-out the filler with binder. Therefore, the ratio of maleic anhydride grafted polyethylene and ethylene/octene copolymer should be between about 1:5 and about 1:15 by weight.

To improve processing of the hot mix in a 2-roll mill, a solid tackier component comprising a hydrocarbon resin having an ester moiety or a hydrogenated aromatic resin is recommended. Other tackifiers including aliphatic resins, polyterpene and dicyclopentadiene did not produce compositions which could be pulled into a nip roll to form a continuous sheet. The preferred ratio of tackifier resin and other resins (grafted polyethylene and ethylene/octene copolymer) is about 1:10 to about 1:20 by weight.

For floor coverings, an ethylene/octene copolymer that has a melt index of about 30 to about 70 grams per 10 minutes and a density of about 0.885 to about 0.902 grams per cubic centimeter is preferred. The selection of tackifier resins for roll tack is crucial for processing in a 2-roll mill and subsequent calender rolls. Hydrogenated mixed aromatic resins such as Regalite R-91 manufactured by Hercules or hydrocarbon resins with ester groups, such as Struktol TR-065 from Struktol Company of America worked well. The presently preferred chlorine-free floor tile formulations have a binder level of between about 11.5% and about 12.5% by weight.

Following are examples of some formulations that have been evaluated and processed using pilot plant or production equipment.

EXAMPLE 1

| Ingredients | Weight % |
| --- | --- |
| 40-mesh limestone | 86.97 |
| Pigment $TiO_2$ | 1.02 |
| Substantially linear ethyleneloctene copolymer resin (70 g/10 min I2 melt index, 0.902 g/cc density) (SLEP 1) | 10.10 |
| MAH-g-PE (1.2% maleic anhydride) | 0.89 |
| Struktol TR-065 tackifier | 1.02 |

The substantially linear ethylene/octene copolymer in this example and the following examples were made in accordance with Lai et al. U.S. Pat. No. 5,272,236 and Lai et al. U.S. Pat. No. 5,278,272, both of which are incorporated by reference. The substantially linear ethylene/octene copolymer resin included 1250 ppm of calcium stearate, 500 ppm Irganox 1010 (hindered phenol stabilizer from Ciba Geigy) and 800 ppm tetrakis(2,4-di-t-butylphenyl)-4,4'-biphenylene dephosphonite from Clariant Corporation (PEPQ); and had an I10/I2 ratio of 7.0. The I10/I2 ratio is the ratio of the melt index measured by ASTM D-1238 (condition 190° C./10 kg), referred to as I10, divided by the melt index measured by ASTM D-1238 (condition 190° C./2. 16 kg), referred to as I2. The MAH-g-PE (1.2% maleic anhydride) is 1.2% maleic anhydride grafted on high density polyethylene having an I2 of 65 g/10 min and a density of 0.935 g/cc. The MAH-g-PE (1.2% maleic anhydride) has an I2 melt index of 8 and a density of 0.953 g/cc, and was used in the following examples. The listed ingredients were mixed in a high intensity mixer such as the Banbury until it reached 330° F. to 340° F. The hot mix was then discharged into a nip of a 20" two-roll mill for sheeting at 8 to 20 feet per minute. The front roll temperature was set at 150° F. to 170° F. while back roll temperature was set at 300° F. to 320° F. Under these conditions, a continuous sheet was formed. The ratio of maleic anhydride grafted polyethylene and ethylene/ octene copolymer was 1:11.35 by weight and the percent by weight of binder was 12%.

COMPARATIVE EXAMPLE 1

The procedure of Example 1 was followed, except 10.99 wt % of the substantially linear ethylene/octene copolymer and no maleic anhydride grafted polyethylene was used. A continuous sheet could not be formed.

EXAMPLE 2

The procedure of Example 1 was followed, except a 50/30 mesh limestone blend was used and the ingredients were mixed in a type-F mixer. At a mix discharge temperature of 275° F. and 300° F. a sheet was formed which had good break strength.

EXAMPLE 3

The procedure of Example 1 was followed, except the following ingredients were used:

| Ingredients | Weight % |
| --- | --- |
| 40-mesh limestone | 88.98 |
| Pigment $TiO_2$ | 1.02 |
| Substantially linear ethylene/octene copolymer resin (SLEP 1) | 8.41 |
| MAH-g-PE (1.2% maleic anhydride) | 0.74 |
| Struktol TR-065 tackifier | 0.85 |

This lower binder level (10%) composition was mixed in a laboratory Banbury. The hot mix appeared to be drier than Example 1, but was still processable using a laboratory 8" two-roll mill and a continuous sheet was formed. The ratio of maleic anhydride grafted polyethylene and ethylene/ octene copolymer was 1:11.37 by weight.

EXAMPLE 4

The procedure of Example 1 was followed, except the following ingredients were used:

| Ingredients | Weight % |
| --- | --- |
| 40-mesh limestone | 79.13 |
| Pigment $TiO_2$ | 1.02 |
| Substantially linear ethylene/octene copolymer resin (SLEP 1) | 16.70 |
| MAH-g-PE (1.2% maleic anhydride) | 1.48 |
| Struktol TR-065 tackifier | 1.67 |

This higher binder level (19.85%) composition was mixed in a laboratory Banbury. The hot mix was "wetter" and presented no processing problems using a 8" two-roll mill and a continuous sheet was formed. The ratio of maleic anhydride grafted polyethylene and ethylene/octene copolymer was 1:11.35 by weight.

EXAMPLE 5

The same procedure, ingredients and weight percent were used as in Example 1 except the Struktol TR-065 was replaced with Regalite R-91 (a hydrogenated mixed aromatic resin manufactured by Hercules). The same process conditions were observed and a continuous sheet was formed.

COMPARATIVE EXAMPLE 2

The same procedure, ingredients and weight percent were used as in Example 1 except the Struktol TR-065 was replaced with other types of tackifiers such as Neville 1200 (a dicyclopentadiene manufactured by the Neville Chemical Co.), Neville 973 (a dicyclopentadiene manufactured by the Neville Chemical Co.), Piccotac-95 (an aliphatic resin manufactured by Hercules), and Wingtack-86 (a polyterpene manufactured by Goodyear). None of the resulting hot mixes could be fed into a nip roll due to poor roll tack. Therefore a continuous sheet could not be formed using a 2-roll mill process.

EXAMPLE 6

The procedure of Example 1 was followed, except the following ingredients were used:

| Ingredients | Weight % |
| --- | --- |
| 40-mesh limestone | 86.97 |
| Pigment $TiO_2$ | 1.02 |
| Substantially linear ethylene/octene copolymer resin (SLEP 1) | 9.53 |
| MAH-g-PE (1.2% maleic anhydride) | 0.84 |
| Indopol L-14 (isobutylene/butene) | 0.62 |
| Struktol TR-065 tackifier | 1.02 |

The use of low molecular weight liquid polybutene Indopol L-14 (manufactured by Amoco) in this example marginally improves flexibility of the product. It improves "tightness and smoothness" of product's surface as it passes through a 2-roll mill and subsequent two calenders. A continuous sheet was formed.

COMPARATIVE EXAMPLE 3

The procedure of Example 1 was followed, except the following ingredients were used:

| Ingredients | Weight % |
| --- | --- |
| 40-mesh limestone | 86.97 |
| Pigment TiO₂ | 1.02 |
| Exact 4033 substantially linear ethylene/butene copolymer (0.8 melt index, 0.88 density g/cc) manufactured by Exxon | 9.43 |
| MAH-g-PE (1.2% maleic anhydride) | 0.84 |
| Indopol L-14 (isobutylene/butene) | 0.62 |
| Struktol TR-065 tackifier | 1.12 |

This composition could not wet out all of the filler at 12% binder level in a Banbury mixer. The resulting mix appeared too dry to form a sheet via a two-roll mill.

COMPARATIVE EXAMPLE 4

The procedure of Example 1 was followed, except the following ingredients were used:

| Ingredients | Weight % |
| --- | --- |
| 40-mesh limestone | 86.97 |
| Pigment TiO₂ | 1.02 |
| Rexene D2300 propylene homopolymer (7.7 melt index, 0.89 density g/cc) manufactured by Rexene Corporation | 10.05 |
| MAH-g-PF (1.2% maleic anhydride) | 0.84 |
| Struktol TR-065 tackifier | 1.12 |

This composition could not wet out all of the filler at 12% binder level in a Banbury mixer. The resulting mix was too dry to form a sheet via a two-roll mill.

COMPARATIVE EXAMPLE 5

The procedure of Example 1 was followed, except the following ingredients were used:

| Ingredients | Weight % |
| --- | --- |
| 40-mesh limestone | 86.97 |
| Pigment TiO₂ | 1.02 |
| Rexene D2180 propylene homopolymer (0.74 density g/cc) manufactured by Rexene Corporation | 10.05 |
| MAH-g-PE (1.2% maleic anhydride) | 0.84 |
| Struktol TR-065 tackifier | 1.12 |

This composition could not wet out all of the filler at 12% binder level in a Banbury mixer. The resulting mix was too dry to form a sheet via a two-roll mill.

COMPARATIVE EXAMPLE 6

The procedure of Example 1 was followed, except the following ingredients were used:

| Ingredients | Weight % |
| --- | --- |
| 50-mesh limestone | 85 |
| Substantially linear ethylene/octene copolymer resin (10 g/10 min I2 melt index, 0.870 g/cc density) (SLEP 2) | 15 |

SLEP 2 included 800 ppm of PEPQ and had an I10/I2 ratio of 7.5. These two ingredients were mixed in either a small Banbury or laboratory Brabender without much success. Not all of the filler was mixed in and the resulting hot mix did not stick to the mill rolls.

COMPARATIVE EXAMPLE 7

The same procedure and ingredients as in Comparative Example 6 were used except the resin to filler ratios were changed to 25/75 and 40/60. At these lower filler levels, all of the filler was worked into the mix but the resulting mix was soft with poor indentation property for a floor tile. Therefore, while the substantially linear ethylene/octene copolymer of the present invention can wet-out the filler at lower filler levels, the MAH-g-PE is necessary at filler levels greater than about 80% by weight.

EXAMPLE 7

The procedure of Example 1 was followed, except the following ingredients were used:

| Ingredients | Weight % |
| --- | --- |
| 50-mesh limestone | 85 |
| Blend of 90% by wt. substantially linear ethylene/octene copolymer resin (1.0 g/10 min I2 melt index, 0.870 g/cc density) (SLEP 3) and 10% by wt. MAH-g-PE (10% maleic anhydride) | 15 |

SLEP 3 included 1250 ppm of calcium stearate, 500 ppm of Irganox and 800 ppm of PEPQ, and had an I10/I2 ratio of 7.6. The ingredients were mixed in a laboratory Banbury and fed to a 8" two-roll mill. A sheet was obtained but the roll tack marginally acceptable.

EXAMPLE 8

The procedure of Example 1 was followed, except the following ingredients were used:

| Ingredients | Weight % |
| --- | --- |
| 40-mesh limestone | 85 |
| Blend of 90% by wt. substantially linear ethylene/octene copolymer (SLEP 4) and 10% by wt. MAH-g-PE (1.2% maleic anhydride) | 15 |

The blend had an I2 melt index of 23 and 0.908 density g/cc. The ingredients were mixed in a laboratory Banbury mixer and the resulting hot mix was fed into a 2-roll mill to form a continuous sheet. Roll tack was acceptable.

We claim:

1. A highly filled surface covering comprising a filled resin layer, the filled resin layer having about 85% to about 95% by weight of filler and a chlorine-free binder, the binder comprising a mixture of a maleic anhydride grafted polyethylene and a substantially linear ethylene/octene copolymer, the ratio of maleic anhydride grafted polyethylene and ethylene/octene copolymer being from about 1:5 to about 1:15 by weight, the substantially linear ethylene/octene copolymer having been formed using a single site catalyst.

2. The surface covering of claim 1, wherein the ratio of maleic anhydride grafted polyethylene and ethylene/octene copolymer is from about 1:9 to about 1:12 by weight.

3. The surface covering of claim 1, wherein the melt index of the ethylene/octene copolymer is between about 10 and about 100 grams per 10 minutes.

4. The surface covering of claim 3, wherein the melt index of the ethylene/octene copolymer is between about 30 and about 70 grams per 10 minutes.

5. The surface covering of claim 1, wherein the density of the ethylene/octene copolymer is between about 0.87 and about 0.91 grams per cubic centimeter.

6. The surface covering of claim 5, wherein the density of the ethylene/octene copolymer is between 0.885 and 0.902 grams per cubic centimeter.

7. The surface covering of claim 1, wherein the filled resin layer is between about 11.5% and about 12.5% by weight of binder.

8. The surface covering of claim 1, wherein the binder further comprises a solid tackifier selected from the group consisting of a hydrocarbon resin having an ester moiety and hydrogenated aromatic resin.

9. The surface covering of claim 1, wherein the filled resin layer is about 85% to about 90% by weight of filler.

10. The surface covering of claim 1, wherein the filler comprises limestone.

* * * * *